United States Patent
Kim (10) Patent No.: US 10,414,356 B2
(45) Date of Patent: Sep. 17, 2019

(54) APPARATUS AND METHOD FOR CONTROLLING DRIVER ASSISTANCE SYSTEM

(71) Applicants: Hyundai Motor Company, Seoul (KR); Kia Motors Corporation, Seoul (KR)

(72) Inventor: Sung Un Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 18 days.

(21) Appl. No.: 15/680,101

(22) Filed: Aug. 17, 2017

(65) Prior Publication Data

US 2018/0170289 A1    Jun. 21, 2018

(30) Foreign Application Priority Data

Dec. 15, 2016  (KR) .................. 10-2016-0171728

(51) Int. Cl.
| | | |
|---|---|---|
| *B60R 16/023* | (2006.01) |
| *G01C 21/36* | (2006.01) |
| *B60W 50/14* | (2012.01) |
| *B60W 40/04* | (2006.01) |
| *G06K 9/00* | (2006.01) |

(Continued)

(52) U.S. Cl.
CPC ......... *B60R 16/0236* (2013.01); *B60W 40/04* (2013.01); *B60W 50/14* (2013.01); *G01C 21/3605* (2013.01); *G01C 21/3676* (2013.01); *G01C 21/3697* (2013.01); *G06K 9/00798* (2013.01); *G06T 7/20* (2013.01); *B60W 2050/146* (2013.01); *G06F 3/0482* (2013.01); *G06T 2207/30236* (2013.01); *G06T 2207/30241* (2013.01); *Y02T 10/84* (2013.01)

(58) Field of Classification Search
CPC ... B60R 16/0236; B60W 40/04; B60W 50/14; G01C 21/3605; G01C 21/3676; G06K 9/00798
USPC ........................................................ 701/23
See application file for complete search history.

(56) References Cited

U.S. PATENT DOCUMENTS

| | | |
|---|---|---|
| 9,372,832 B2 | 6/2016 | Shikimachi |
| 2016/0311323 A1 | 10/2016 | Lee et al. |

(Continued)

FOREIGN PATENT DOCUMENTS

| | | |
|---|---|---|
| JP | 2013-217725 A | 10/2013 |
| JP | 2014-218124 A | 11/2014 |

(Continued)

*Primary Examiner* — Krishnan Ramesh
(74) *Attorney, Agent, or Firm* — Morgan, Lewis & Bockius LLP (57) ABSTRACT

An apparatus for controlling a driver assistance system, may include a vehicle information providing device that is configured to provide user state information, personal driving pattern information, and vehicle surrounding information including road information, an advanced driver assistance system (ADAS) driving search device that searches for and recommends an ADAS function for a vehicle driving route by determining information provided from the vehicle information providing device, and a user interface device that displays the ADAS function recommended by the ADAS driving search device together with the vehicle driving route when the user inputs a destination.

18 Claims, 5 Drawing Sheets

(51) Int. Cl.
*G06T 7/20* (2017.01)
*G06F 3/0482* (2013.01)

(56) References Cited

U.S. PATENT DOCUMENTS

| | | | |
|---|---|---|---|
| 2017/0076600 A1* | 3/2017 | Scofield | G08G 1/0112 |
| 2018/0127001 A1* | 5/2018 | Ricci | B60R 25/2018 |
| 2018/0143639 A1* | 5/2018 | Singhal | G01S 13/862 |
| 2018/0218610 A1* | 8/2018 | Augst | G08G 1/164 |
| 2019/0126942 A1* | 5/2019 | Goto | B60W 50/14 |

FOREIGN PATENT DOCUMENTS

| | | |
|---|---|---|
| KR | 10-2004-0028377 A | 4/2004 |
| KR | 10-2013-0065433 A | 6/2013 |
| KR | 10-2016-0013680 A | 2/2016 |
| KR | 10-1647848 B1 | 8/2016 |
| KR | 10-2016-0127492 A | 11/2016 |

\* cited by examiner

APPARATUS AND METHOD FOR CONTROLLING DRIVER ASSISTANCE SYSTEM

CROSS-REFERENCE TO RELATED APPLICATION

The present application claims priority to Korean Patent Application No. 10-2016-0171728, filed on Dec. 15, 2016, the entire contents of which is incorporated herein for all purposes by this reference.

BACKGROUND OF THE INVENTION

Field of the Invention

The present invention relates to an apparatus and a method for controlling a driver assistance system, and more particularly, to a technique of controlling an operation of the driver assistance system according to a vehicle driving route.

Description of Related Art

In recent years, vehicles have combined with information technology (IT) to provide various functions. To improve the vehicle driving stability and secure the user's convenience, vehicles have been developed to be equipped with various advanced driver assistance systems (ADAS).

In the present case, the ADAS is a system capable of performing functions including an adaptive headlamp, a front collision avoidance, a lane departure prevention, a blind spot monitoring, an improved rear monitoring, and the like using an advanced detecting apparatus and an intelligent imaging apparatus. In recent years, an ADAS using map information and position information acquired through a navigation system has been developed instead of using a detector and an imaging apparatus. The ADAS, which uses map information and location information, is defined as a map-based ADAS.

Meanwhile, as wired and wireless communication has been developed, the user's interest has increasingly moved from vehicles equipped with an on-board navigation system to vehicles equipped with an off-board navigation system. The on-board navigation system acquires map information and position information internally, and the off-board navigation system receives the map information or the position information acquired by an external terminal or server through various communication methods.

In this case, all functions of the advanced driver assistance system may be set before the vehicle is driven or according to a user's desire while the vehicle is driven.

That is, it is difficult to change the function of the advanced driver assistance system to continuously reflect the present vehicle driving state because only the function of the advanced driver assistance system preset when the vehicle is stopped or driven is applied.

The information disclosed in this Background of the Invention section is only for enhancement of understanding of the general background of the invention and should be taken as an acknowledgement or any form of suggestion that this information forms the prior art already known to a person skilled in the art.

BRIEF SUMMARY

Various aspects of the present invention are directed to providing an apparatus and a method for controlling an advanced driver assistance system, which is configured for allowing a user to determine in advance whether to execute a function of an advanced driver assistance system (ADAS) by controlling wherein an executable portion of the ADAS function is displayed and set, and to confirm the increase or decrease in fuel efficiency due to the execution of the ADAS function.

The technical problems to be solved by the present inventive concept are not limited to the aforementioned problems, and any other technical problems not mentioned herein will be clearly understood from the following description by those skilled in the art to which the present invention pertains.

According to various aspects of the present invention, there is provided an apparatus for controlling a driver assistance system, which includes a vehicle information providing device that provides user state information, personal driving pattern information, and vehicle surrounding information including road information, an advanced driver assistance system (ADAS) driving search device that searches for and recommends an ADAS function suitable for a vehicle driving route by determining information provided from the vehicle information providing device, and a user interface device that displays the ADAS function recommended by the ADAS driving search device together with the vehicle driving route when the user inputs a destination.

The apparatus may further include a vehicle hardware system that transmits or receives the vehicle surrounding information to or from the vehicle information providing device.

The apparatus may further include a storage device that stores the vehicle surrounding information.

The user interface device may display the ADAS function based on a color or a kind of a line denoting a driving route according to the vehicle driving route.

The ADAS driving search device may compare plan information for an ADAS function selection by the user and result information with each other.

The ADAS driving search device may search for a driving route again when a traffic jam occurs on a driving road while the vehicle is driven.

The user interface device may provide a report including the ADAS function provided in real time, a driving route distance, a driving time, and a fuel efficiency according to the ADAS function selected by the user.

The user interface device may display plan information for an ADAS function selection by the user and result information.

The plan information and the result information may be displayed in forms of information related to a vehicle driving time and fuel efficiency.

The user interface device may display a ADAS function or a plurality of ADAS functions selected by the user.

The user interface device may provide the user with a start and an end portion of the ADAS function, and the user may click the ADAS function through the user interface device to end or re-confirm the ADAS function.

The vehicle information providing device may provide road information including a general road, a highway, and a vehicle speed limit.

According to various aspects of the present invention, there is provided a method of controlling a driver assistance system, which includes providing user state information, personal driving pattern information, and vehicle surrounding information including road information, searching for and recommending an ADAS function suitable for a vehicle driving route by determining information provided from the vehicle information providing device, and displaying the ADAS function recommended together with the vehicle driving route when the user inputs a destination.

The displaying of the ADAS function may include displaying the ADAS function based on a color or a kind of a line denoting a driving route according to the vehicle driving route.

The method may further include comparing plan information for an ADAS function selection of the user and result information with each other after the displaying of the ADAS function is performed.

The method may further include providing a report including the ADAS function provided in real time, a driving route distance, a driving time, and fuel efficiency according to the ADAS function selected by the user after the comparing of the plan information and the result information is performed.

The plan information and the result information may be displayed in forms of information related to a vehicle driving time and fuel efficiency.

The searching and recommending of the ADAS function may include searching for a driving route again when a traffic jam occurs on a driving road while the vehicle is driven.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the sprit and scope of the invention as defined by the appended claims.

As used herein, the term "and/or" includes any and all combinations of a or more of the associated listed items. It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Also, as used herein, the singular forms "a," "an" and "the" are intended to include the plural forms as well, unless the context clearly indicates otherwise. It will be further understood that the terms "comprises" and/or "comprising," when used in the present specification, specify the presence of stated features, integers, steps, operations, elements, and/or components, but do not preclude the presence or addition of a or more other features, integers, steps, operations, elements, components, and/or groups thereof.

Hereinafter, embodiments of the present invention will be described in detail with reference to accompanying drawings.

Figure 1:
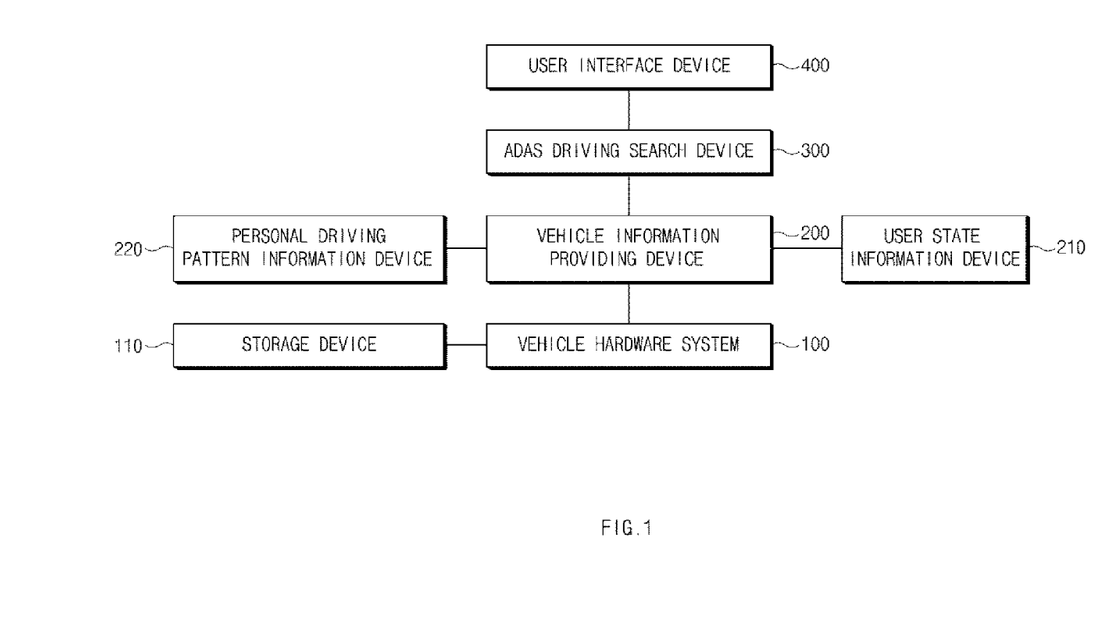
FIG. 1 is a view illustrating the configuration of an apparatus for controlling an advanced driver assistance system according to an exemplary embodiment of the present invention.

FIG. 1 is a view illustrating the configuration of an apparatus for controlling an advanced driver assistance system (ADAS) according to an exemplary embodiment of the present invention.

Referring to FIG. 1, an apparatus for controlling an advanced driver assistance system (ADAS) includes a vehicle hardware system 100, a vehicle information providing device 200, an ADAS driving search device 300, and a user interface device 400.

The vehicle hardware system 100 includes a sensor device, a communication device and an operating system (OS). For example, the vehicle hardware system 100 receives peripheral information related to a vehicle (hereinafter referred to as "peripheral information") including a measured distance to the front or rear of a vehicle, a lane recognized through a camera disposed in the vehicle, and the like, and transmits/receives the vehicle surrounding information to/from the vehicle information providing device 200.

The vehicle hardware system 100 may include a storage device 110 for storing the vehicle surrounding information regarding the measured distance to the front or rear of a vehicle, the lane recognized through a camera disposed in the vehicle, and the like.

The vehicle information providing device 200, which is an application module of the ADAS driving search device 300, provides information including a user state information received from a user state information device 210, vehicle surrounding information including personal driving pattern information received from a personal driving pattern information device 220, traffic volume information, traffic jam information, and the like, or road information including information related to a general road type, vehicle speed limit, and the like.

The ADAS driving search device 300 searches for and provides (or recommends) an ADAS function suitable for a driving route of the vehicle by comprehensively determining the user state information, the personal driving pattern information, and the vehicle surrounding information including the traffic volume information, the traffic jam information, the road information, and the like provided from the vehicle information providing device 200.

In the present case, the ADAS function (kind) includes a traffic jam assist system (TJAS), a highway driving assist system (HDAS), a smart cruise control system (SCCS), a lane keeping assist system (LKAS), and the like.

As a scheme of displaying the ADAS function, the ADAS function may be variously displayed on the user interface device 400 according to colors or kinds of lines, which are distinguished from each other on the vehicle driving route, together with a highway, a general road, a vehicle speed limit, a real-time traffic volume, and the like.

The ADAS driving search device 300 compares and analyzes plan information and result information to allow the user to select the ADAS function.

In addition, the ADAS driving search device 300 searches for a driving route again when a traffic jam occurs on a driving road while the vehicle is driven.

In addition, the ADAS driving search device 300 may appropriately recommend a short route in which the ADAS function is inactivated and a long route in which the ADAS function is activated.

The user interface device 400 includes an audio/video/navigation (AVN), a head-up display (HUD), a cluster, a monitor, and the like.

The user interface device 400 displays a vehicle driving route thereon when a user inputs a destination. For example, user interface device 400 may display a route through a navigation system which receives driving-related information from GPS. As a scheme of displaying a route, a graphic or a photo may be used. In addition, as a scheme of displaying a route through a navigation system, it is possible to use a recommended route including a route having the shortest time to the destination, a route having the shortest distance to the destination, and a route having the least cost to the destination.

When the user inputs a destination, the user interface device 400 displays the ADAS function provided (recommended) from the ADAS driving search device 300 together with the vehicle driving route.

In the present case, the ADAS function (kind) includes a traffic jam assist system (TJAS), a highway driving assist system (HDAS), a smart cruise control system (SCCS), a lane keeping assist system (LKAS), and the like.

After the vehicle arrives at the destination, the user interface device 400 provides a report including the ADAS function provided in real time and a driving route distance, a driving time and fuel efficiency according to the ADAS function selected by the user.

In detail, the user interface device 400 compares and analyzes plan information for selecting an ADAS function with result information related to the selected ADAS function and displays the analysis result. In the present case, the plan information and the result information may be displayed in forms of a vehicle driving time and fuel efficiency through the user interface device 400.

The function execution plan of the ADAS and the result of executing the function after the vehicle arrives at the destination will be described in detail with reference to FIG. 4.

In addition, the user may select a ADAS function or a plurality of ADAS is configured to be operated by use of the user interface device 400, and the user interface device 400 may display the a ADAS function or the ADAS functions selected by the user.

In addition, when the user selects or cancels the ADAS function, the user interface device 400 may display the vehicle fuel efficiency and the estimated arrival time corresponding to the selection or cancel.

In addition, the user interface device 400 may provide the user with the start and end portion of the ADAS function, and the user may terminate or reconfirm the ADAS function through a click function.

Figure 2:
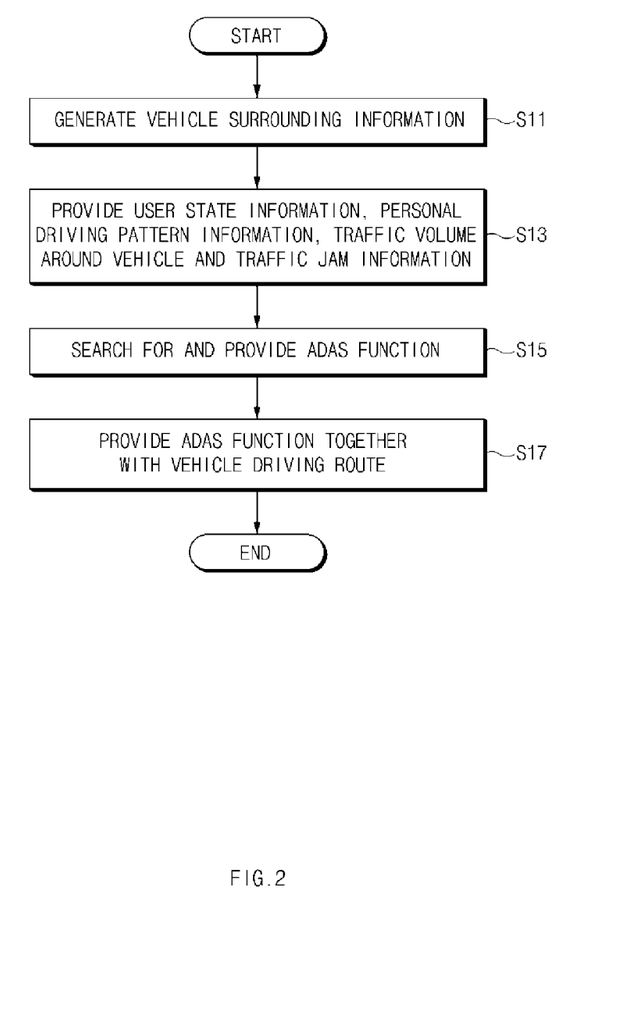
FIG. 2 is a flowchart illustrating a method of controlling an advanced driver assistance system according to an exemplary embodiment of the present invention.

FIG. 2 is a flowchart illustrating a method of controlling an advanced driver assistance system according to an exemplary embodiment of the present invention.

Referring to FIG. 2, in operation S11, the vehicle hardware system generates the vehicle surrounding information.

For example, the vehicle surrounding information related to the measured distance to the front or rear of a vehicle, the lane recognized through the camera disposed in the vehicle, and the like, may be recognized by the vehicle hardware system including a detection device, a communication device, or an OS.

Then, in operation S13, the vehicle information providing device 200 provides information related to a user state when the user drives the vehicle, the personal driving pattern information, the vehicle surrounding information including information related to the traffic volume around the vehicle, the traffic jam information, and the like.

Then, in operation S15, the ADAS driving search device 300 searches for and provides the ADAS function by comprehensively determining the user state information, the personal driving pattern information, the vehicle surrounding information and the like provided from the user state information device 210.

Then, in operation S17, when the user inputs a destination, the user interface device 400 provides the ADAS are configured together with the vehicle driving route.

The user interface device 400 searches for and displays a recommendation driving route based on the destination input by the user.

For example, the user interface device 400 may display the route through a navigation system which receives driving-related information from GPS. As a scheme of displaying a route, a graphic or a photo may be used. In addition, as a scheme of displaying a route through a navigation system, it is possible to use a recommended route including a route having the shortest time to the destination, a route having the shortest distance to the destination, and a route having the least cost to the destination.

In the present case, the user may confirm the ADAS function displayed on the user interface device 400 and may select or cancel the ADAS function.

In addition, the user may confirm again the ADAS function activated while the vehicle is driven.

Figure 3:
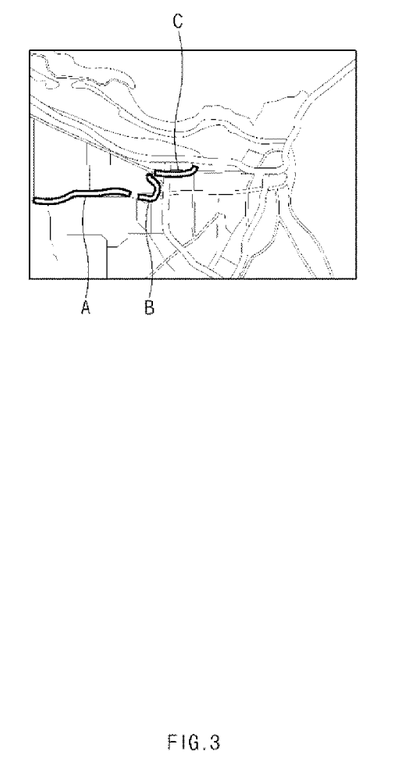
FIG. 3 is a view illustrating a method of displaying an executable portion in the ADAS function along the vehicle driving route according to an exemplary embodiment of the present invention.

FIG. 3 is a view illustrating a method of displaying an executable portion in the ADAS function along the vehicle driving route according to an exemplary embodiment of the present invention.

Referring to FIG. 3, as executable portions of the ADAS function along the vehicle driving route are displayed by the apparatus for controlling the ADAS, a first portion A is displayed when the HDAS, the SCCS, and the LKAS are selected by the user, a second portion B is displayed when the SCCS and the LKAS are selected by the user, and a third portion C is displayed when the TJAS is selected by the user.

Figure 4:
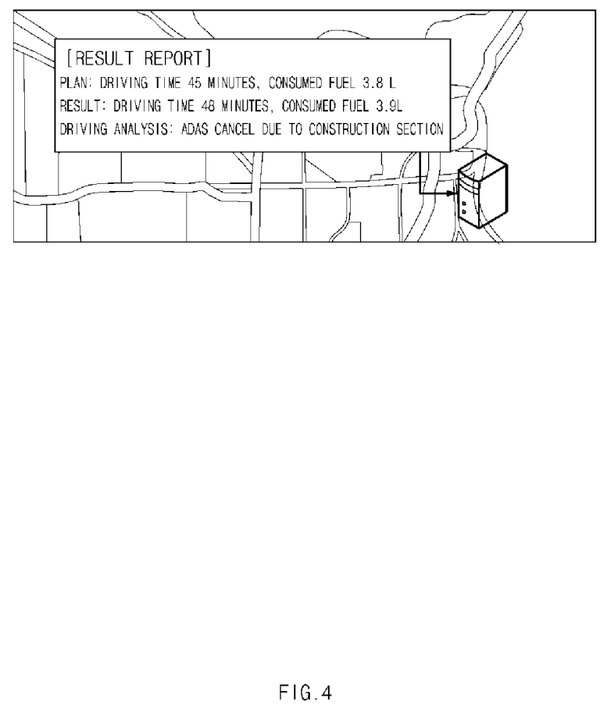
FIG. 4 is a view illustrating a function execution plan and a function execution result of the ADAS after arrival at a destination in a method of controlling the ADAS according to an exemplary embodiment of the present invention.

FIG. 4 is a view illustrating a function execution plan and a function execution result of the ADAS after arrival at a destination in a method of controlling the ADAS according to an exemplary embodiment of the present invention.

Referring to FIG. 4, the apparatus for controlling an ADAS provides the report including the driving route distance, the driving time, the fuel efficiency and the provided ADAS function according to the selection of the ADAS function after the vehicle arrives at a destination.

In detail, the apparatus for controlling an ADAS compares and analyzes the plan information for selecting the ADAS function and the result information related to the selected ADAS function and displays the analysis result. In the present case, the plan information and the result information may be displayed in forms of information related to a vehicle driving time and fuel efficiency through the user interface device 400.

In addition, the user may select a ADAS function or a plurality of ADAS is configured to be operated by use of the user interface device 400, and when the ADAS function is selected or cancelled by the user, the apparatus for controlling an ADAS may display the vehicle fuel efficiency and the estimated arrival time corresponding to the selection or cancellation.

Figure 5:
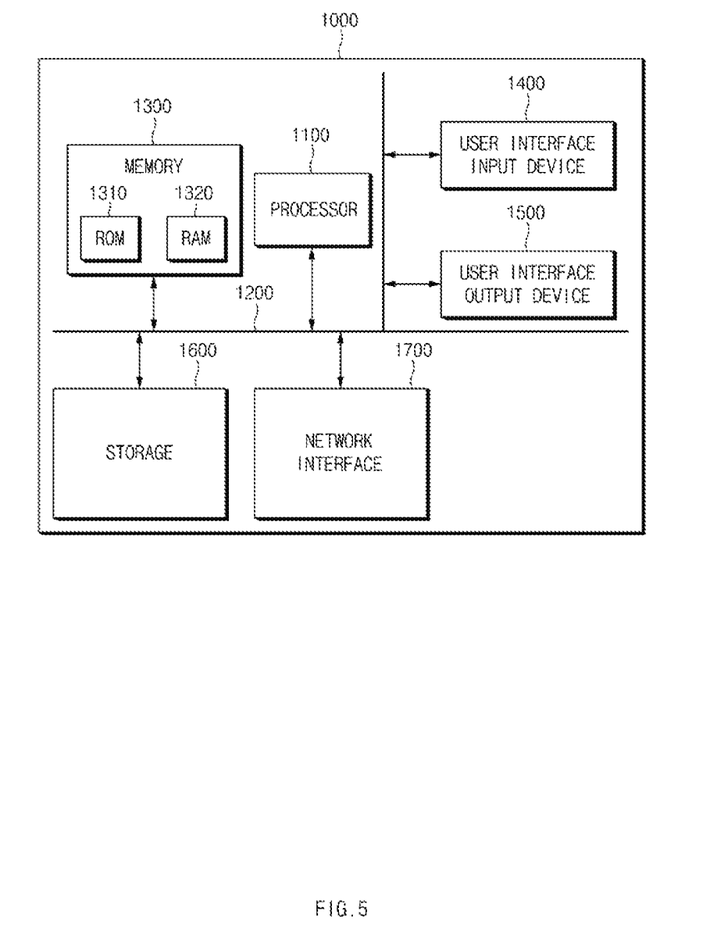
FIG. 5 is a block diagram illustrating a computer system executing a method of controlling an ADAS according to an exemplary embodiment of the present invention.

FIG. 5 is a block diagram illustrating a computer system executing a method of controlling an ADAS according to an exemplary embodiment of the present invention.

Referring to FIG. 5, a computing system 1000 may include at least a processor 1100, a memory 1300, a user interface input device 1400, a user interface output device 1500, a storage 1600, and a network interface 1700 which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM). The operations of a method or algorithm described with reference to the embodiments disclosed herein may be embodied directly in hardware, in a software module executed by the processor 1100, or in a combination of the two. The software module may reside in a storage medium (that is, the memory 1300 or and/or the storage 1600) including a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 wherein the processor 1100 may read information from, and write information to, the storage medium. Alternatively, the storage medium may be integrated into the processor 1100. The processor and the storage medium may reside in an application specific integrated circuit (ASIC). The ASIC may reside within a user terminal. Alternatively, the processor and the storage medium may reside in the user terminal as individual components.

The present technology may allow a user to determine in advance whether to execute the ADAS function according to the vehicle driving situation.

In addition, the present technology may confirm the increase or decrease of the fuel efficiency according to the execution of the ADAS function.

The above-described method according to an exemplary embodiment of the present invention may be recorded as a computer program. A code and a code segment constituting the program may be readily inferred by a computer programmer in the field. In addition, the program may be stored in computer-readable recording media (information storage media) and may be read and executed by a computer, implementing the method of the present invention. The recording media may include any types of computer-readable recording media.

The present technology may allow a user to determine in advance whether to execute the ADAS function according to the vehicle driving situation.

In addition, the present technology may confirm the increase or decrease of the fuel efficiency according to the execution of the ADAS function.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a driver assistance system, the apparatus comprising:
   a vehicle information providing device configured to provide a driving state including user state information, personal driving pattern information, and vehicle surrounding information including road information;
   an advanced driver assistance system (ADAS) driving search device configured to search for and recommend a type of ADAS function for a vehicle driving route based on the driving state; and
   a user interface device configured to display the type of ADAS function recommended by the ADAS driving search device together with the vehicle driving route when a user inputs a destination,
   wherein the type of ADAS function includes a traffic jam assist system (TJAS), a highway driving assist system (HDAS), a smart cruise control system (SCCS), and a lane keeping assist system (LKAS).

2. The apparatus of claim 1, further including:
   a vehicle hardware system configured to transmit or receive the vehicle surrounding information to or from the vehicle information providing device.

3. The apparatus of claim 2, further including:
   a storage device configured to store the vehicle surrounding information.

4. A method of controlling a driver assistance system, the method comprising:
   providing a driving state including user state information, personal driving pattern information, and vehicle surrounding information including road information;
   searching for and recommending a type of ADAS function for a vehicle driving based on the driving state; and displaying the type of ADAS function recommended together with the vehicle driving route when a user inputs a destination, wherein the type of ADAS function includes a traffic jam assist system (TJAS), a highway driving assist system (HDAS), a smart cruise control system (SCCS), and a lane keeping assist system (LKAS).

5. The apparatus of claim 1, wherein the user interface device displays the type of ADAS function based on a color or a kind of a line denoting a driving route according to the vehicle driving route.

6. The apparatus of claim 1, wherein the ADAS driving search device is configured to compare plan information for a type of ADAS function selection by the user and result information with each other.

7. The apparatus of claim 1, wherein the ADAS driving search device searches for a driving route again when a traffic jam occurs on a driving road while the vehicle is driven.

8. The apparatus of claim 1, wherein the user interface device is configured to provide a report including the type of ADAS function provided in real time, and a driving route distance, a driving time and a fuel efficiency according to the type of ADAS function selected by the user.

9. The apparatus of claim 1, wherein the user interface device displays plan information for a type of ADAS function selection by the user and result information.

10. The apparatus of claim 9, wherein the plan information and the result information are displayed in forms of information related to a vehicle driving time and fuel efficiency.

11. The apparatus of claim 1, wherein the user interface device displays the type of ADAS function or a plurality of types of ADAS function selected by the user.

12. The apparatus of claim 1, wherein the user interface device is configured to provide the user with a start and an end portion which the type of ADAS function is performed, and wherein the type of ADAS function is configured to be clicked by the user through the user interface device to end or re-confirm the ADAS function.

13. The apparatus of claim 1, wherein the vehicle information providing device is configured to provide road information including a general road, a highway, and a vehicle speed limit.

14. The method of claim 4, wherein the searching and recommending of the type of ADAS function includes:
searching for a driving route again when a traffic jam occurs on a driving road while the vehicle is driven.

15. The method of claim 4, wherein the displaying the type of the ADAS function includes displaying the type of ADAS function based on a color or a kind of a line denoting a driving route according to the vehicle driving route.

16. The method of claim 4, further including:
comparing plan information for a type of ADAS function selection by the user and result information with each other after the displaying of the type of ADAS function is performed.

17. The method of claim 16, further including:
providing a report including the type of ADAS function provided in real time, and a driving route distance, a driving time and a fuel efficiency according to the ADAS function selected by the user after the comparing of the plan information and the result information is performed.

18. The method of claim 16, wherein the plan information and the result information are displayed in forms of information related to a vehicle driving time and fuel efficiency.

* * * * *